United States Patent [19]
Hudson

[11] 3,915,514
[45] Oct. 28, 1975

[54] METHOD OF MAKING A BEARING SYSTEM HAVING ENTRAINED WEAR-RESISTANT PARTICLES

[75] Inventor: Lester S. Hudson, Dallas, Tex.
[73] Assignee: Dresser Industries, Inc., Dallas, Tex.
[22] Filed: Apr. 23, 1974
[21] Appl. No.: 463,334

Related U.S. Application Data
[62] Division of Ser. No. 298,684, Oct. 18, 1972.

[52] U.S. Cl. ......... 308/8.2; 308/237 A; 308/DIG. 8
[51] Int. Cl.² ......................................... F16C 33/12
[58] Field of Search............ 308/8.2, 237 R, 237 A, 308/239, 241, DIG. 8; 175/371, 372; 29/195

[56] References Cited
UNITED STATES PATENTS

| | | | |
|---|---|---|---|
| 3,235,316 | 2/1966 | Whanger | 308/237 X |
| 3,480,341 | 11/1969 | Hickernell | 308/8.2 |
| 3,784,264 | 1/1974 | Jackson | 308/8.2 |

*Primary Examiner*—M. Henson Wood, Jr.
*Assistant Examiner*—Gene A. Church
*Attorney, Agent, or Firm*—Eddie E. Scott

[57] ABSTRACT

A rock bit bearing system is provided by filling a groove in the bearing pin of the bit with a deposit including a multiplicity of tungsten carbide particles in a high temperature resistant metal matrix. The tungsten carbide particles are introduced into the deposit using a welding rod that combines the tungsten carbide particles with hard metal welding rod materials.

2 Claims, 3 Drawing Figures

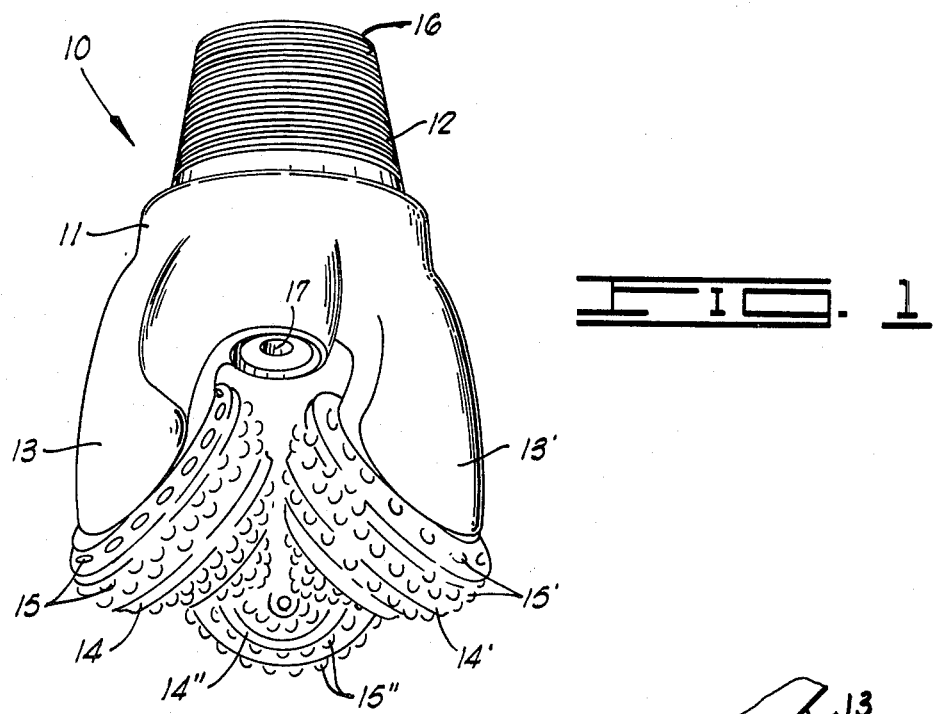
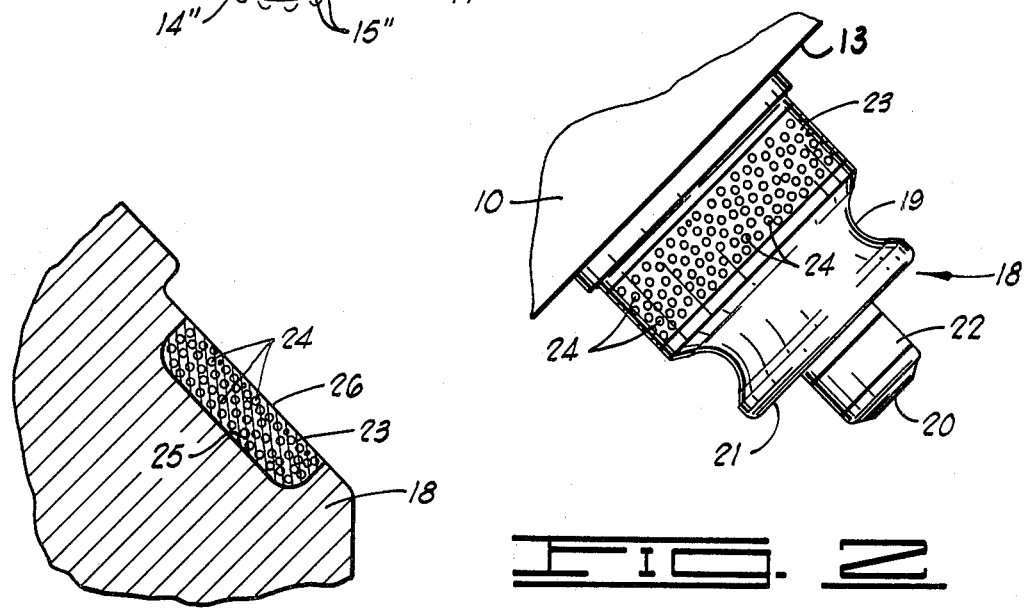
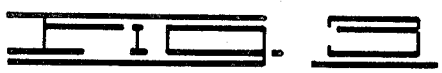

METHOD OF MAKING A BEARING SYSTEM HAVING ENTRAINED WEAR-RESISTANT PARTICLES

This is a division, of application Ser. No. 298,684 filed Oct. 18, 1972.

DESCRIPTION OF THE PRIOR ART

In U.S. Pat. No. 2,595,903 to K. H. Swart, patented May 6, 1952 a three cone rock bit is shown. The bit includes three shanks which are assembled together to form the bit. The lower end of each shank is formed into a journal and a generally conical tooth cutter is received over the journal. The bearing system includes friction-type bearings and anti-friction bearings. This patent sets out some of the problems encountered with rotary rock bits.

In U.S. Pat. No. 3,235,316 to J. R. Whanger, patented Feb. 15, 1966 a journal bearing for a rock bit is shown with alternating surface areas of wear-resistant and anti-galling materials. The bearing system disclosed in this patent includes grooves in one of the rotatable members with a soft metal having anti-galling characteristics positioned in the grooves.

In U.S. Pat. No. 3,023,130 to R. D. Wasserman, patented Feb. 27, 1962 a material which deposits a hard surface upon a base metal is shown. The surfaced metals are, for example, used to provide wear-resistant surfaces for tools which are subjected to severe abrasive wear in such use as hand and power shovels, and various types of cutting tools.

In U.S. Pat. No. 3,330,934 to J. F. Quaas, patented July 11, 1967 a flux-coated welding rod for depositing a carbide-laden surface layer upon a parent metal is shown. A welding rod is constructed with a mass of fine refractory carbide particles compressed and sintered in the presence of small amounts of a metallic binder such as cobalt, nickel or molybdenum to fuse it together.

In U.S. Pat. No. 2,199,440, patented May 7, 1940 a coated welding rod is disclosed. Elements such as chromium, tungsten, manganese and silicon may be added to the weld puddle by the ductile metal welding rod with the aforementioned elements.

SUMMARY OF THE INVENTION

The present invention provides a novel bearing system with a multiplicity of hard particles such as tungsten carbide particles dispersed in a high temperature resistant metal matrix. In one embodiment of the invention, a groove is formed in the bearing pin of a rotary rock bit. The groove is filled with a deposit including a multiplicity of tungsten carbide particles dispersed in a deposit that retains hardness at elevated temperatures. The tungsten carbide particles are introduced into the deposit using a welding rod that combines the tungsten carbide particles with hard metal welding rod materials. The above and other features and advantages of the present invention will become apparent from a consideration of the following detailed description of the invention when taken in conjunction with the drawings.

BRIEF DESCRIPTION OF THE DRAWINGS

FIG. 1 is a pictorial view of a three cone rotary rock bit.

FIG. 2 shows the bearing pin of the bit shown in FIG. 1.

FIG. 3 is a cross section of a portion of the bearing pin shown in FIG. 2.

DETAILED DESCRIPTION OF THE INVENTION

Referring now to FIG. 1, a three cone jet-type rotary rock bit is shown and generally designated by the reference number 10. The bit 10 includes a bit body 11 including an upper threaded portion 12. The threaded portion 12 allows the bit 10 to be connected to the lower end of a rotary drill string (not shown). Depending from the bit body 11 are three substantially identical arms with two of the arms 13 and 13' being shown in FIG. 1. Three rotary cone cutters 14, 14' and 14" are rotatably positioned on three bearing pins extending from the arms. Each of the cutters 14, 14' and 14" includes cutting structures 15, 15' and 15", respectively, on its outer surface adapted to disintegrate the formations as the bit 10 is rotated and moved through the formations. The cutting structure 15, 15' and 15" is shown in the form of tungsten carbide inserts; however, it is to be understood that other cutting structures, such as steel teeth, may be used as a cutting structure on the cone cutters.

The bit 10 includes a central passageway 16 extending along the central axis of body 11 to allow drilling fluid to enter from the upper section of the drill string (not shown) immediately above and pass downward through three jet nozzles, one nozzle 17 being shown in FIG. 1, to the bottom of the well bore. In use, the bit 10 is connected as a lower member of a rotary drill string (not shown) and lowered into a well bore until the cone cutters 14, 14' and 14" engage the bottom of the well bore. Upon engagement with the bottom of the well bore, the drill string is rotated, rotating bit 10 therewith. The cone cutters 14, 14' and 14" rotate on their respective bearing pins. Drilling fluid is forced downward through the interior passage of the rotary drill string and the drilling fluid continues through the central passageway 16 of bit 10 passing through the nozzles to the bottom of the well bore, thence upward in the annulus between the rotary drill string and the wall of the well bore to the earth's surface.

Referring now to FIG. 2, a portion of one of the arms 13 of bit 10 is shown with the cutter 14 removed from the bearing pin 18. The bearing pin 18 includes a ball bearing raceway 19 adapted to receive a set of ball bearings that are positioned between the bearing pin 18 and cone cutter 14 in a conventional manner. A thrust button 20 is mounted in the end of bearing pin 18 and adapted to bear against a bearing surface (not shown) in the nose of the cone cutter 14. A thrust flange surface 21 is also provided to support at least a portion of the thrust load by engaging a corresponding thrust flange surface (not shown) on the cone cutter 14. A nose bushing 22 is positioned around the end of the bearing pin 18 to transmit radial loads. A journal inlay 23 is also positioned around the bearing pin 18 to transmit radial loads. The journal inlay 23 includes a multiplicity of hard particles 24 dispersed in a metal matrix.

Referring now to FIG. 3, a cross section of a portion of the bearing pin 18 is shown. A groove 25 is formed in the bearing pin 18. The groove 25 is filled with a deposit that forms the journal inlay 23. This deposit includes a multiplicity of sintered tungsten carbide particles 24 dispersed throughout the metal matrix. The journal inlay 23 is machined to form a finished bearing surface 26. Although the finished bearing surface is shown as a journal inlay, it is to be understood that other types of bearing surfaces are contemplated. For example, the inlay 23 might form a segment of the bearing surface 26 extending along only ⅓ of the circumference of the bearing pin 18.

The form of the deposit of this invention incorporates a hard metal composition which consists essentially of the following formulation:

| Constituent | Per Cent by Weight |
| --- | --- |
| Carbon | .90 to 3.50 |
| Chromium | 24.00 to 33.00 |
| Tungsten | 6.00 to 18.00 |
| Silicon | .40 to 2.00 |
| Tungsten Carbide (particles) | 34.00 to 42.00 |
| Cobalt | Balance |

The tungsten carbide particles are discrete tungsten carbide particles of dimensions varying between 8 to 300 mesh.

A preferred example of the deposit consists essentially of the following formulation:

| Constituent | Per Cent by Weight |
| --- | --- |
| Carbon | 1.40 |
| Chromium | 31.00 |
| Tungsten | 8.00 |
| Silicon | .80 |
| Tungsten Carbide (particles) | 40.00 |
| Cobalt | Balance |

The tungsten carbide particles in the preferred example are discrete refractory sintered tungsten carbide particles of dimensions of 20–30 mesh.

The above deposit gives a good metal-to-metal wear resistance and also gives a high hardness at elevated temperatures. When the sintered tungsten carbide particles are embedded in a hard metal matrix, they become small wear pads and the edges are not exposed in a cutting tool fashion.

The journal inlay deposit 23 is produced by coating a hard metal welding rod with sodium silicate and sprinkling or rolling the rod in sintered tungsten carbide particles thus sticking the particles to the rod. For example, a Stellite type welding rod may be coated with sodium silicate and the welding rod sprinkled or rolled in tungsten carbide particles. The rod is then used to form the journal inlay deposit 23 by welding thereby dispersing the tungsten carbide particles 24 through the deposit.

The embodiments of the invention in which an exclusive property or privilege is claimed are defined as follows:

1. A rock bit bearing, comprising:
   a bearing pin,
   a groove in said bearing pin,
   a deposit within said groove with said deposit including a multiplicity of hard particles in a metal matrix, said deposit consisting essentially of the following formulation:

| Constituent | Per Cent by Weight |
| --- | --- |
| Carbon | .90 to 3.50 |
| Chromium | 24.00 to 33.00 |
| Tungsten | 8.00 to 18.00 |
| Silicon | .40 to 2.00 |
| Tungsten Carbide (particles) | 34.00 to 42.00 |
| Cobalt | Balance. | a bearing surface on said deposit, and
   a rotatable cutter positioned on said bearing pin.

2. The rock bit bearing of claim 1 wherein said tungsten carbide particles are of dimensions between 8 to 300 mesh.

* * * * *